April 28, 1970     V. C. CARR     3,508,650

COVER MEMBERS FOR FASTENERS IN SCREEN PLATE ASSEMBLIES

Filed Sept. 12, 1968

United States Patent Office 3,508,650
Patented Apr. 28, 1970

3,508,650
COVER MEMBERS FOR FASTENERS IN SCREEN PLATE ASSEMBLIES
Vivian C. Carr, Oadby, Leicester, England, assignor to The Dunlop Company Limited, London, England, a British company
Filed Sept. 12, 1968, Ser. No. 759,425
Claims priority, application Great Britain, Sept. 23, 1967, 43,382/67
Int. Cl. B07b 1/00, 1/46; F16b 35/00
U.S. Cl. 209—399    1 Claim

ABSTRACT OF THE DISCLOSURE

A screen plate assembly for use in a screening plant for screening particulate material including a perforated screen plate formed of a high abrasion-resistant plasic material, a support means therefor, and at least one metal fastener for clamping the screen plate to the support means, wherein the head portion of the fastener is provided with a protective flap formed of a similar plastic material and having a U-shaped cross-sectional configuration. One limb of the flap is secured beneath the head of the fastener and the other limb covers the head.

---

This invention relates to cover members, particularly for metal machinery parts which are normally subjected to abrasion in service.

In screening plant employed, for example at mines and quarries, material is normally graded by passing it over vibrating screens. Such screens may be formed of woven wire mesh or may be in the form of perforated plates of, for example, steel. Such screens may only have a life of 4–6 weeks, since the screened material quickly abrades their surfaces, necessitating frequent stoppages of the plant for replacement of worn screens, and it has been proposed to replace the steel plates by plates made from a highly abrasion-resistant plastics material such as polyurethane. However, such polyurethane screen plates are normally secured in their working position on a vibrator frame by means of clamping bars of mild steel fastened to the frame by coach bolts, and it is found that the heads of the coach bolts have a life which, although comparable with that of a steel screen plate, is too sort to enable full advantage to be secured from the use of an abrasion-resistant plate.

One object of the present invention is to provide means to enable full advantage to be taken of the improved properties of abrasive resistant screens.

According to the invention, a cover member for a metal fastening member comprises a flap formed from a highly abrasion-resistant and flexible plastics material, the flap having a pair of limbs disposed relative to one another so as to tend to lie in superimposed relationship with one another, the arrangement being such that one limb of the flap may be secured beneath an enlarged portion of an associated fastening member, the other limb then tending to lie over the said portion so as to protect the fastening member from abrasion.

The invention also provides a screen plate fastening device incorporating a fastening member protected against abrasion by a cover member as defined in the preceding paragraph.

Preferably the flap is moulded from polyurethane in a generally U-shaped cross-sectional configuration, one limb having a curved profile adapted to cover a coach bolt head and the other limb being pierced to permit the coach bolt to be passed through it.

Embodiments of the invention will now be described by way of example with reference to the accompanying drawings in which.

A screening plant for a quarry comprises a perforated polyurethane sheet 1 (see FIGURE 1) mounted on a vibrator frame (not shown) which is driveably connected to a suitable motor (not shown) by means of which the frame and the polyurethane sheet are vibrated.

Unscreened ore material 2 is caused to pass across the polyurethane sheet 1 in the direction of arrow A to effect screening of the ore particles.

A series of L-section metal support members 3 are welded to the vibrator and extend across the frame from one side thereof to the other to support the polyurethane sheet 1.

The polyurethane sheet 1 is clamped to the support members 3 by a series of steel clamping bars 4 extending across the frame, one above each support member and a series of fastening devices provided at spaced apart position along each clamping bar.

Figure 1:
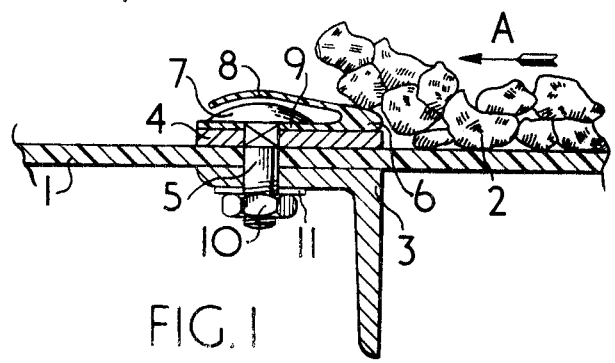
FIGURE 1 shows a cross-sectional view of a cover member according to the invention forming part of a screen plate fastening device in which the cover member is mounted to protect the head of a coach bolt from abrasion.

As shown in FIGURE 1, each fastening device comprises a coach bolt 5 extending through aligned holes in its respective clamping bar 4, support member 3, and in the polyurethane sheet 1.

A cover member in the form of a polyurethane flap 6 is provided to protect the head 7 of the coach bolt 5 from abrasion by the ore material 2. The flap is moulded in the form of a pair of generally rectanguler pieces of polyurethane of dimensions approximately 2 inches by 1½ inches secured together in superimposed aligned relation along one of their shorter sides. Thus the flap has a generally U-shaped cross-section, with upper and lower limbs 8 and 9 respectively.

The lower limb 9 of the flap is pierced and the coach bolt 5 extends through the aperture, with its hear 7 located between the limbs 8, 9 of the flap, so that the lower limb is clamped beween the head of the bolt and the clamping bar 4. The upper limb 8 of the flap has a curved cross-sectional profile and fits over the rounded head of the bolt.

The fastening device is held in position by means of a nut 10 threaded on the lower end of the shank of the coach bolt 5 and which engages a washer 11 located between the nut and the underside of the support member 3.

The cover member is arranged so that the edge at which its two limbs 8, 9 are joined is the leading edge of the flap relative to the direction of flow of ore material. This prevents any tendency for the upper limb 8 to be lifted by the ore.

Figure 3:
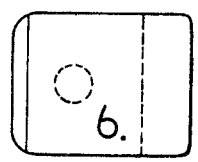
FIGURE 3 shows a plan view of a cover member according to the invention.
Figure 2:
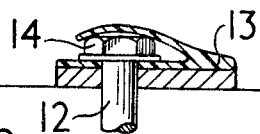
FIGURE 2 shows a cross-sectional view of a detail of a fastening device otherwise similar to that of FIGURE 1 but in which the cover member is mounted to protect the head of a hexagon-headed bolt from abrasion.

In a second embodiment of the invention, illustrated in FIGURE 2, a fastening device otherwise similar to that described above comprises a hexagon-headed bolt 12 instead of a coach bolt, and a polyurethane flap 13 is arranged to protect the hexagon head 14 of the bolt in a manner similar to that described above in connection with the flap 6.

While in the embodiments described above an individual cover member is provided for each bolt head, the cover member for a line of bolts could be in the form of a continuous extruded length of abrasion-resisting material having a U-shaped cross-section as described above.

By the use of a bolt head cover as described above the life of an associated bolt can be prolonged to at least the same length as that of a polyurethane screen, and this helps to reduce the need for frequent maintenance of the screening plant.

It will be noted that although in the past it has been proposed to provide caps for screens and the like for protective purposes, the cover members forming the embodiments of the invention described above provide significant advantages over such caps.

Under the arduous abrasive conditions encountered in screening plant, for example, the requirements of a cover member for a bolt or the like are that it should provide high resistance to abrasion, that it should not reduce the effectiveness of the bolt for the bolt's load-taking purposes and that it should be economical to produce.

Cover members according to the invention take full advantage of the high abrasion resistance properties of a material such as polyurethane, provide direct transfer of thrust from the bolt head through one of the limbs of the cover member and are economical to produce by, for example, extrusion followed by cutting the extruded length into individual cover members and punching an aperture in one of the limbs of each cover member.

Furthermore, the cover members are positively located because the bolts pass through an aperture in one of the limbs and therefore in spite of the inherent flexible nature of polyurethane, the cover member is secure and cannot be dislodged even under the most arduous conditions.

Having now described my invention, what I claim is:

1. In a screening plant for screening particulate material, having an improved screen plate assembly comprising a perforated screen plate formed from flexible and high abrasion-resistant polyurethane plastics material, support means for said screen plate, and at least one metal fastener for clamping said screen plate to the support means, said fastener extending through said screen plate and having an enlarged end portion on one side of said screen plate; the improvement comprising: a cover member adapted to protect said enlarged end portion of the fastener from abrasion by particulate material, said cover member being formed from a flexible and highly abrasion-resistant polyurethane material, and having first and second limbs arranged so as to tend to lie in superimposed relationship with one another; said first limb having an aperture formed therein through which said fastener extends, being thereby clamped upon assembly between the enlarged end portion of said fastener and the screen plate; and said second limb tending to lie over said enlarged end portion of the fastener; with said first and second limbs being joined along one edge, said edge constituting the leading edge of the cover member with respect to the movement of particulate material across the screen plate.

References Cited

UNITED STATES PATENTS

| | | | |
|---|---|---|---|
| 2,857,797 | 10/1958 | Morgan | 85—53 X |
| 2,950,819 | 8/1960 | Holmon et al. | 209—331 X |
| 3,456,795 | 7/1969 | Svensson et al. | 209—399 |

RAMON S. BRITTS, Primary Examiner

U.S. Cl. X.R.

85—53; 209—408